(12) United States Patent
Jialanella et al.

(10) Patent No.: US 7,683,132 B2
(45) Date of Patent: Mar. 23, 2010

(54) ACCELERATED ORGANOBORANE INITIATED POLYMERIZABLE COMPOSITIONS

(75) Inventors: Gary L. Jialanella, Oxford, MI (US); Toni Ristoski, Rochester Hills, MI (US); Arthur F. Cawley, Lake Orion, MI (US); Eric E. Cole, Grand Blanc, MI (US); Dean A. Johnson, North Branch, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 12/182,170

(22) Filed: Jul. 30, 2008

(65) Prior Publication Data

US 2008/0295961 A1 Dec. 4, 2008

Related U.S. Application Data

(62) Division of application No. 11/546,794, filed on Oct. 12, 2006, now Pat. No. 7,524,907.

(51) Int. Cl.
| | |
|---|---|
| C08F 4/52 | (2006.01) |
| C08F 4/12 | (2006.01) |
| C08F 4/00 | (2006.01) |
| C08F 14/02 | (2006.01) |
| C08F 14/14 | (2006.01) |
| C08F 118/02 | (2006.01) |
| C08F 120/18 | (2006.01) |
| C08F 20/10 | (2006.01) |
| C08L 27/04 | (2006.01) |
| C08G 65/46 | (2006.01) |
| B29C 65/00 | (2006.01) |

(52) U.S. Cl. .................. 525/213; 526/328; 526/89; 526/195; 526/291; 526/319; 526/329.7; 526/196; 528/491; 156/349

(58) Field of Classification Search .............. 526/89, 526/195, 196, 291, 319, 328, 329.7, 124.6, 526/124.8; 525/213; 528/491; 156/349
See application file for complete search history.

(56) References Cited

U.S. PATENT DOCUMENTS

| | | | |
|---|---|---|---|
| 3,236,823 | A | 2/1966 | Leverkusen et al. |
| 3,275,611 | A | 9/1966 | Mottus et al. |
| 3,527,737 | A | 9/1970 | Masuhara et al. |
| 3,819,447 | A | 6/1974 | Dailibor et al. |
| 3,890,407 | A * | 6/1975 | Briggs et al. ............... 525/164 |
| 3,971,751 | A | 7/1976 | Isayama et al. |
| 4,106,971 | A | 8/1978 | Briggs et al. |
| 4,112,013 | A | 9/1978 | Briggs et al. |
| 4,344,800 | A | 8/1982 | Lutz |
| 4,385,153 | A | 5/1983 | Ritter |
| 4,426,243 | A | 1/1984 | Briggs |
| 4,448,927 | A | 5/1984 | Faloener et al. |
| 4,515,724 | A | 5/1985 | Ritter |
| 4,536,546 | A | 8/1985 | Briggs |
| 4,538,920 | A | 9/1985 | Drake |
| 4,552,604 | A | 11/1985 | Green |
| 4,676,858 | A | 6/1987 | Ritter |
| 4,705,838 | A | 11/1987 | Goel |
| 4,746,725 | A | 5/1988 | Evans et al. |
| 4,773,957 | A | 9/1988 | Briggs |
| 4,788,254 | A | 11/1988 | Kawakubo et al. |
| 4,823,927 | A | 4/1989 | Jensen |
| 4,920,188 | A | 4/1990 | Sakashita |
| 4,921,921 | A | 5/1990 | Ritter |
| 4,942,201 | A | 7/1990 | Briggs et al. |
| 4,985,477 | A | 1/1991 | Collins et al. |
| 4,985,516 | A | 1/1991 | Sakashita et al. |
| 5,034,464 | A | 7/1991 | Arduengo |
| 5,079,098 | A | 1/1992 | Liu |
| 5,082,147 | A | 1/1992 | Jacobs |
| 5,106,928 | A | 4/1992 | Skoultchi et al. |
| 5,112,691 | A | 5/1992 | Briggs et al. |
| 5,126,416 | A | 6/1992 | Yang |
| 5,132,377 | A | 7/1992 | Nakano et al. |
| 5,143,884 | A | 9/1992 | Skoultchi et al. |

(Continued)

FOREIGN PATENT DOCUMENTS

WO  WO 99/64475  12/1999

OTHER PUBLICATIONS

Chemical Abstract 116:195541w—Epoxy Resin Binder for Commutator Sheet Mica., Ivanilova, et al.
Martin Skoultchi et al., Chemical Abstract vol. 119, 1983, 78, 119:74163c Acrylic Adhesive Composition and Organoboron Initiator System, Ablestick Labs.
Yishihiro Kimura, Chemical Abstract, 128:218101s, Acrylic Adhesive Compositions, JP.
Derwent Abstract 92-085634/11, Shinetsu Chem Ind KK.
E. Arancibia et al., Mechanism of Vinyl Monomer Polymerization in the Presence of Trialkylboranes and Inhibitors, Journal of Polymer Science: Part A-1, vol. 7 (1969), 3430-3433, Jun. 13, 1969, Universidad Técnica del Estado, Santiago, Chile.

(Continued)

*Primary Examiner*—Vasu Jagannathan
*Assistant Examiner*—Karuna P Reddy
(74) *Attorney, Agent, or Firm*—Dobrusin & Thennisch PC; Norman L. Sims

(57) ABSTRACT

The invention is a two part polymerizable composition comprising in one part an organoboron compound capable of forming free radical generating species and in the second part one or more compounds capable of free radical polymerization and from about 20 to about 30 parts by weight based on the weight of the second part of i) a halogenated polyolefin having halosulfonyl groups or ii) a mixture of a halogenated polyolefin and an organic sulfonyl halide. The second part may further contain a compound capable of causing the organoboron compound to form free radical generating species upon contacting the two parts. The first part may further comprise one or more compounds capable of free radical polymerization.

15 Claims, 1 Drawing Sheet

U.S. PATENT DOCUMENTS

| | | |
|---|---|---|
| 5,204,386 A | 4/1993 | Ersun-Hallsby et al. |
| 5,206,288 A | 4/1993 | Gosiewski et al. |
| 5,223,597 A | 6/1993 | Iwakiri et al. |
| 5,250,228 A | 10/1993 | Baigrie et al. |
| 5,286,821 A | 2/1994 | Skoultchi |
| 5,308,895 A | 5/1994 | Gan et al. |
| 5,310,835 A | 5/1994 | Skoultchi et al. |
| 5,344,890 A | 9/1994 | Miyazono et al. |
| 5,376,746 A | 12/1994 | Skoultchi |
| 5,401,805 A | 3/1995 | Chung et al. |
| 5,404,805 A | 4/1995 | Fujimoto et al. |
| 5,409,995 A | 4/1995 | Iwahara et al. |
| 5,411,998 A | 5/1995 | McArdle et al. |
| 5,420,223 A | 5/1995 | Johnson |
| RE35,058 E | 10/1995 | Yang |
| 5,506,326 A | 4/1996 | Kneafsey |
| 5,539,070 A | 7/1996 | Zharov et al. |
| 5,567,833 A | 10/1996 | Iwahara et al. |
| 5,599,856 A | 2/1997 | Gardner |
| 5,616,796 A | 4/1997 | Pocius et al. |
| 5,621,143 A | 4/1997 | Pocius |
| 5,674,941 A | 10/1997 | Cho et al. |
| 5,679,458 A | 10/1997 | Cho et al. |
| 5,681,910 A | 10/1997 | Pocius |
| 5,684,102 A | 11/1997 | Pocius |
| 5,686,544 A | 11/1997 | Pocius |
| 5,690,780 A | 11/1997 | Zharov et al. |
| 5,691,065 A | 11/1997 | Zharov et al. |
| 5,705,561 A | 1/1998 | Kozakiewicz et al. |
| 5,718,977 A | 2/1998 | Pocius |
| 5,721,281 A | 2/1998 | Blount |
| 5,795,657 A | 8/1998 | Pocius et al. |
| 5,807,910 A | 9/1998 | Tseng et al. |
| 5,817,376 A | 10/1998 | Everaerts et al. |
| 5,837,155 A | 11/1998 | Inagaki et al. |
| 5,859,155 A | 1/1999 | Furihata et al. |
| 5,861,910 A | 1/1999 | Pocius |
| 5,872,197 A | 2/1999 | Deviny |
| 5,883,208 A | 3/1999 | Deviny |
| 5,912,433 A | 6/1999 | Pulido |
| 5,935,711 A | 8/1999 | Pocius et al. |
| 5,948,854 A | 9/1999 | De Buyl et al. |
| 5,952,409 A | 9/1999 | Boardman et al. |
| 5,990,036 A | 11/1999 | Deviny |
| 5,994,484 A | 11/1999 | Pocius |
| 6,001,928 A | 12/1999 | Harkness et al. |
| 6,008,284 A | 12/1999 | Nylund et al. |
| 6,008,308 A | 12/1999 | Pocius |
| 6,027,813 A | 2/2000 | Deviny |
| 6,054,548 A | 4/2000 | Currie et al. |
| 6,090,904 A | 7/2000 | Körner et al. |
| 6,093,778 A | 7/2000 | Pocius |
| 6,207,781 B1 | 3/2001 | Halloran et al. |
| 6,225,408 B1 | 5/2001 | Huang et al. |
| 6,252,023 B1 | 6/2001 | Moren |
| 6,339,114 B1 | 1/2002 | Klee et al. |
| 6,410,667 B1 * | 6/2002 | Moren .................. 526/217 |
| 6,630,555 B2 | 10/2003 | Kendall et al. |
| 6,706,831 B2 | 3/2004 | Sonnenschein et al. |
| 6,710,145 B2 | 3/2004 | Sonnenschein et al. |
| 6,713,578 B2 | 3/2004 | Sonnenschein et al. |
| 6,713,579 B2 | 3/2004 | Sonnenschein et al. |
| 6,727,320 B2 | 4/2004 | Attarwala et al. |
| 6,730,759 B2 | 5/2004 | Sonnenschein et al. |
| 6,740,716 B2 | 5/2004 | Sonnenschein et al. |
| 6,762,260 B2 | 7/2004 | Sonnenschein et al. |
| 6,777,512 B1 | 8/2004 | Sonnenschein et al. |
| 6,806,330 B1 | 10/2004 | Sonnenschein et al. |
| 6,844,080 B2 | 1/2005 | Kneafsey et al. |
| 6,867,271 B1 | 3/2005 | Maandi et al. |
| 2002/0028894 A1 * | 3/2002 | Sonnenschein et al. ..... 526/198 |
| 2002/0111439 A1 | 8/2002 | Attarwala et al. |
| 2003/0018611 A1 | 1/2003 | Yano et al. |
| 2003/0109638 A1 | 6/2003 | Briggs et al. |
| 2003/0226472 A1 | 12/2003 | Kneafsey et al. |
| 2004/0068067 A1 | 4/2004 | Kneafsey et al. |
| 2004/0082743 A1 | 4/2004 | Sonnenschein et al. |
| 2004/0242817 A1 | 12/2004 | Kendall et al. |
| 2005/0137370 A1 | 6/2005 | Jialanella et al. |
| 2007/0079931 A1 | 4/2007 | Feng et al. |
| 2008/0103274 A1 | 5/2008 | Jialanella et al. |

OTHER PUBLICATIONS

F.S. Arimoto, Polymerization with Organoboron Compounds, Journal of Polymer Science: Part A-1, vol. 4, 275-282 (1966), E.I. DuPont de Nemours and Company, Inc., Wilmington, Delaware.

G.W. Bailey, Journal of Polymer Science, vol. 62, (1962), pp. 241-249, Sep. 11, 1961, Baton Rouge, LA.

V.A. Dorokhov et al., Organoboron Compounds CCIX. Complexes of Trialkylboranes with Amidines, ZH. Obshch. Khim., vol. 46, No. 55, 1057-1059, May 1976, Plenum Publishing Corporation, New York, NY.

V.A. Dodonov et al., Polymerization of Some Vinyl Monomers on Triisobutylboron-Containing Radical Initiators in the Presence of Hydroquinone and Benzoquinone, Polymer Science, vol. 35, No. 3, 1993, 403-406, Nizhnii Novgorod, 603600, Russia.

Seiichiro Fujisawa et al., Dental Self-Curing resins. XI. Characterization of Several Complexes of Tri-N-Butyl Borane as an Initiator, 73:88532, XP002160417-Abstract & Iyo Kizai Kenkyusho Hokoku, Tokyo Ike Shika Daigaku (1969), 3, 64-71, Chemical Abstract.

J. Grotewold et al., Vinyl Monomer Polymerization Mechanism in the Presence of Trialkylboranes, Journal of Polymer Science: Part A-1, vol. 6, 3157-3162 (1968), Técnica del Estado, Santiago, Chile.

J. Harris et al., Proposed Mechanism for the Curing of Epoxy Resins with Amine-Lewis Acid Complexes or Salts, J. Appl. Polym. Sci., 10, 523-534 (1966), Koppers Co., Inc., Monroeville, PA.

Hoberg et al., Journal of Organometallic Chemistry, 1976, 118, C3-C5 (no translation provided), Elsevier Sequoia, S.A., Lausanne, Netherlands.

Herbert O. House, Modern Synthetic Reactions, 786 (1972), Georgia Institute of Technology, The Benjamin/Cummings Publishing Company.

Susumu Iwabuchi et al., The Copolymerization of Vinylhydroquinone and Acrylonitrile by Tri-N-Butylborane, Polymer Journal, vol. 6, No. 2, 185-190 (1974), Chiba 280, Japan.

Dr. Gordon M. Kline, Plastics Technical Section, Acceleration of Glycidyl Epoxy Resin-Anhydride Reactions, 149, 150, 152, 154, 155, 158, 160, 186, Apr. 1964, Sperry Gyroscope Co.

Roland Koester et al., Boron Compounds. XXVII. Borylation of Several Amino Carboxylic Acids, Justus Liebigs Ann, Chem. (1974), 112-119, XP000982170, (no translation provided).

V. Kokle et al., Journal of Polymer Science, The Molecular Structure of Polyethylene. XI. Weight- and Number-Average Molecular Weights of Selected Samples, vol. 62, 251-261 (1962), E.I. DuPont de Nemours and Co., Inc., Wilmington, Delaware.

Kuniharu Kojima et al., Polymer Letters, vol. 8, 541-547 (1970) Polymerization of Methyl Methacrylate by Trialklborane-Pyridine System, Chiba University, Yayoi-Cho, China.

Peter Love et al., Polar Substituent Effects in Gas-Phase Lewis Acid-Base Equilibria. I. Intrinsic Basicity of Amines, J. Amer. Chem. Soc. (May 8, 1968), 90(10), 2455-62, XP000982168, Tables 1, EX. T, Columns 4 and 5.

M. Tsukada et al., Grafting of Methyl Methacrylate Onto Silk Fibers Initiated by Tri-N-Butylborane, Journal of Applied Polymer Science, vol. 42, (1991), 2115-2121, John Wiley & Sons, Inc.

Derwent Abstract 84-159009/26, DD207436-A, Veb Filmfab Wolfen.

Derwent Abstract 85-301176/48, SU 1155607, Kha Kirakosyan.

Derwent Abstract 87-3313768/47, J62236-878-A, Sumitomo Elec Ind KK.

Derwent Abstract 88-202092/29, J63139-969-A, Kanegafuchi Chem KK.

Derwent Abstract 90-332394/44, J02240130-A, Denki Kagaku Kogyo KK.

Derwent Abstract 90-332395/44, J02240131-A, Denki Kagaku Kogyo KK.

Derwent Abstract 92-289585/35, JP04199694-A, Shinetsu Chem Ind Co. Ltd.

Derwent Abstract 94-164114/20, JP06107907-A, Nippon Zeon KK.

Derwent Abstract 95-041525/06, JP06322324-A, Shinetsu Chem Ind Co. Ltd.

Derwent Abstract 96-453820/45, ADGE=93.05.28, Adgeziv Co. Ltd., RU2054022-C1.

Derwent Abstract 95-049086/07, JP06330015-A, Nissan Motor Co. Ltd.

Derwent Abstract 96-484098, SU 1457392A1, Dodonov et al.

Derwent Abstract 97-010377, SU 1609117A1, Dodonov et al.

Derwent Abstract 97-064052, SU162491A1, Dodonov et al.

Derwent Abstract 97-529863/49, JP09208921-A, Shinetsu Chem Ind Co. Ltd.

Derwent Abstract 98-189554/17, JP10046126-A, Nippon Synthetic Chem Ind Co.

Derwent Abstract 98-343543/30, JP101360612-A, Nippon Synthetic Chem Ind Co.

Derwent Abstract 98-357757/31, JP10140119-A, Nippon Synthetic Chem Inc. Co.

Derwent Abstract 99-010842/02, DE19738208-A1, T. Tseng et al.

Derwent Abstract 99-283642/24, JP11092593-A, Hitachi Chem Co. Ltd.

* cited by examiner

ACCELERATED ORGANOBORANE INITIATED POLYMERIZABLE COMPOSITIONS

This application is a divisional of copending application Ser. No. 11/546,794, filed Oct. 12, 2006.

BACKGROUND OF THE INVENTION

This invention relates to accelerated polymerizable compositions comprising compounds containing moieties capable of free radical polymerization, organoboron compounds capable of forming free radical generating species capable of initiating free radical polymerization and adhesives based on such compositions. In another embodiment the invention relates to a method of polymerizing compounds containing moieties capable of free radical polymerization and to methods of bonding substrates using such compositions.

Low surface energy olefins such as polyethylene, polypropylene and polytetrafluoroethylene have a variety of attractive properties in a variety of uses, such as toys, automobile parts, furniture applications and the like. Because of the low surface energy of these plastic materials, it is very difficult to find adhesive compositions that bond to these materials. Adhesives have been developed for bonding to these plastics. A series of patents issued to Skoultchi, U.S. Pat. Nos. 5,106,928; 5,143,884; 5,286,821; 5,310,835 and 5,376,746; Zharov et al., U.S. Pat. Nos. 5,539,070, 5,690,780 and 5,691,065; Pocius, U.S. Pat. Nos. 5,616,796; 5,621,143; 5,681,910; 5,686,544; 5,718,977; and 5,795,657; and Sonnenschein et al. U.S. Pat. Nos. 6,806,330; 6,730,759; 6,706,831; 6,713,578; 6,713,579 and 6,710,145 (all incorporated herein by reference) disclose polymerizable acrylic compositions which are particularly useful as adhesives wherein organoboron amine complexes are used to initiate cure. It is disclosed that these complexes are useful for initiating polymerization of adhesives which bond to low surface energy substrates.

Many of the disclosed compositions polymerize more slowly than is desired for use in industrial processes. This results in processes which exhibit low productivity. Jialanella, U.S. Patent Publication 2005-0137370 A1 discloses that the addition of cure accelerators to the above described compositions wherein the cure accelerators comprise compounds containing quinone structures; or compounds containing at least one aromatic ring and at least one, preferably two, substituents on the aromatic ring selected from hydroxyl, ether and both wherein the two substituents are located either ortho or para with respect to one another, and a compound having a peroxy moiety. The accelerators described function well with the disadvantage is that the use of such compounds adds an additional component to the formulations. The use of additional components adds cost to the formulations.

Therefore, there is a need for adhesive systems that are capable of bonding to low surface energy substrates which cure rapidly and do not require the addition of another component.

SUMMARY OF INVENTION

The invention is a two part polymerizable composition comprising in one part an organoboron compound capable of forming free radical generating species and in the second part one or more compounds capable of free radical polymerization and from about 20 to about 30 parts by weight based on 100 parts of the second part of i) a halogenated polyolefin having halosulfonyl groups or ii) a mixture of a halogenated polyolefin and an organic sulfonyl halide. The second part may further contain a compound capable of causing the organoboron compound to form free radical generating species upon contacting the two parts. The first part may further comprise one or more compounds capable of free radical polymerization. This facilitates formulating compositions that have commercially desirable volumetric ratios of the two parts. Adhesive compositions of the present formulation provide excellent adhesion to low surface energy substrates, such as plastics, and exhibit a faster curing profile.

The invention is also a method of polymerization comprising contacting the components of the polymerizable composition under conditions such that the polymerizable compounds undergo polymerization. In one embodiment, the contacting occurs at, or near, ambient temperature. In another embodiment, the method further comprises the step of heating the polymerizable composition to an elevated temperature under conditions such that the organoboron compound forms a free radical generating species.

In yet another embodiment the invention is a method of bonding two or more substrates together which comprises contacting the components of the polymerizable composition together under conditions, such that polymerization is initiated; contacting the polymerizable composition with the two or more substrates; positioning the two or more substrates, such that the polymerizable composition is located between the two or more substrates; and allowing the polymerizable composition to polymerize and to bond the two or more substrates together. In yet another embodiment the invention is a method of coating a substrate which comprises contacting a composition according to the invention with one or more surfaces of a substrate and initiating polymerization of the composition according to the invention. In another embodiment, the invention is a method of coating a substrate which comprises contacting the components of the composition of the invention; contacting the contacted composition with one or more surfaces of a substrate; and allowing the coating composition to cure. In another embodiment the invention is a laminate comprising two substrates having disposed between the substrates and bound to each substrate a composition according to the invention.

The polymerizable compositions of the invention are stable at, or near, ambient temperature and can be cured upon demand by contacting the two parts of the composition, or alternatively by contacting the two parts of the composition and thereafter heating the compositions above the temperature at which the organoboron compound forms a free radical generating species. Furthermore, the polymerizable compositions of the invention can form good bonds to low surface energy substrates without the need for primers or surface treatment, especially at low temperatures. The polymerizable compositions of the invention may be formulated to be dispensed in commercial equipment at volume ratios of the two parts of 4:1 or less. The polymerized compositions demonstrate excellent cohesive and adhesive strength at elevated temperatures and thus demonstrate excellent stability at high temperatures. The polymerizable compositions of the invention exhibit rapid cure and preferably exhibit a lap shear strength according to ASTM 03165-91 of 50 psi or greater 1 hour after application. Preferably, the polymerizable compositions demonstrate excellent adhesion to substrates along with the rapid cure as discussed.

DETAILED DESCRIPTION OF THE INVENTION

Figure 1:
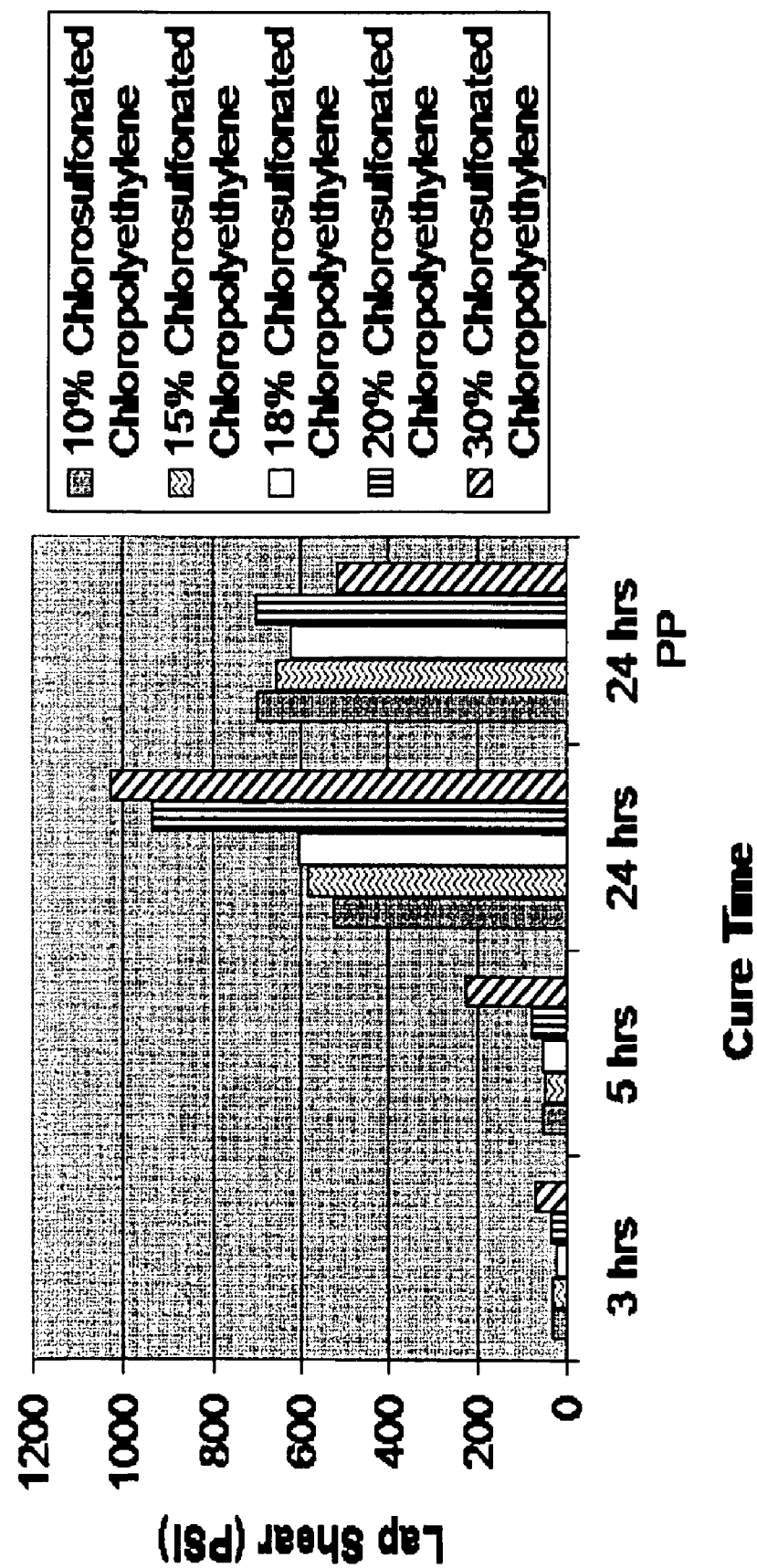
FIG. 1 is a graph of the data generated in the Examples.

The polymerization initiator is an organoboron containing compound which is capable of forming a trivalent organoboron compound. In a preferred embodiment, the free radical generating species is a trivalent organoboron compound free. Preferred boron containing compounds are tetravalent in that they have four bonds to the boron of which at least three are covalent and one may be covalent or in the form of an electronic association with a complexing agent. The free radical generating species, such as a trivalent boron compound, is formed when the boron containing compound is contacted with another substance, referred to herein as a liberating compound. The free radical generating species generates free radicals by reacting with environmental oxygen. In the embodiment wherein the boron containing compound is tetravalent such contacting causes the abstraction of one of the ligands bonded to or complexed to the boron atom to convert it to a trivalent borane. Free radical generating species is a compound that contains or generates free radicals under polymerization conditions. The liberating compound can be any compound which reacts with the complexing agent or which abstracts a cation from the boron containing compound. Preferably, the boron containing compound is an organoborate, an organoboron amine complex or an amido organoborate.

An organoborate is a salt of a positive cation and an anionic tetravalent boron. Any organoborate which can be converted to an organoboron by contact with a decomplexing agent or initiator may be used. One class of preferred organoborates, (also known as quaternary boron salts) are disclosed in Kneafsey et al., U.S. 2003/0226472 and Kneafsey et al., U.S. 2004/0068067, both incorporated herein by reference. Preferred organoborates disclosed in these two U.S. patent applications are described by the following formula

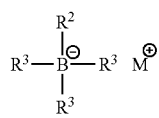

wherein $R^2$ is $C_1$-$C_{10}$ alkyl;

$R^3$ is independently in each occurrence $C_1$-$C_{10}$ alkyl, $C_3$-$C_{10}$ cycloalkyl, phenyl, phenyl-substituted $C_1$-$C_{10}$ alkyl or phenyl substituted $C_3$-$C_{10}$ cycloalkyl, provided that any two of $R^2$ and/or $R^3$ may optionally be part of a carbocyclic ring; and $M^+$ is a metal ion or a quaternary ammonium ion. Preferred examples of organoborates include sodium tetraethyl borate, lithium tetraethyl borate, lithium phenyl triethyl borate and tetramethylammonium phenyl triethyl borate.

In another embodiment, the organoborate is an internally blocked borate as disclosed in Kendall et al., U.S. Pat. No. 6,630,555, incorporated herein by reference. Disclosed in this patent are four coordinate internally blocked borates wherein the boron atom is part of a ring structure further containing an oxa or thio-moiety. The internally blocked heterocyclic borates preferably have the following structure:

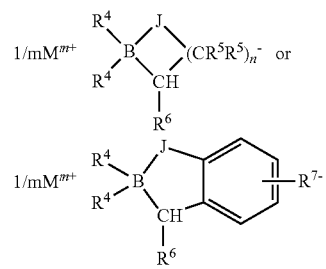

wherein J is oxygen or sulfur; when J represents oxygen, n is the integer 2, 3, 4 or 5;

when J represents sulfur, n is the integer 1, 2, 3, 4 or 5; $R^4$, $R^5$, $R^6$ and $R^7$ are independently, substituted or unsubstituted, alkyl or alkylene groups containing 1 to 10 carbon atoms, substituted aryl groups having up to 7 to 12 carbon atoms or unsubstituted aryl groups; $R^5$, $R^6$ and $R^7$ can be hydrogen; $R^4$ can be part of a second unsubstituted or substituted cyclic borate; $R^4$ can comprise a spiro ring or a spiro-ether ring; $R^4$ together with $R^5$ can be linked to form a cycloaliphatic ring; or $R^4$ together with $R^5$ can comprise a cyclic ether ring and M in this context, is any positively charged species; with m being a number greater than 0.

The term "internally blocked" in reference to the organoborates described herein means a four coordinate boron atom being part of an internal ring structure bridged across two of the four boron coordinates or valences. Internal blocking includes a single ring or a multi-ring structure where boron is part of one or multi-ring structures.

In the embodiment where the organoboron compound is in the form of an amine complex, the free radical generating species used in the invention is a trialkyl borane or an alkyl cycloalkyl borane. The organoboron used in the complex is a trialkyl borane or an alkyl cycloalkyl borane. Preferably such borane corresponds to the formula:

B—(R¹)₃ wherein B represents Boron; and $R^1$ is separately in each occurrence a $C_{1-10}$ alkyl, $C_{3-10}$ cycloalkyl, or two or more of $R^1$ may combine to form a cycloaliphatic ring. Preferably $R^1$ is $C_{1-4}$ alkyl, even more preferably $C_{2-4}$ alkyl, and most preferably $C_{3-4}$ alkyl. Among preferred organoborons are tri-ethyl borane, tri-isopropyl borane and tri-n-butylborane.

In the embodiment wherein the organoboron compound is an organoboron amine complex, the organoboron is a trivalent organoboron and the amine can be any amine which complexes reversibly with the organoboron. Such complexes are represented by the formula

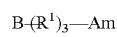

B-(R¹)₃—Am wherein $R^1$ is described hereinbefore and Am is an amine.

The amines used to complex the organoboron compound can be any amine or mixture of amines which complex the organoboron and which can be decomplexed when exposed to a liberating compound. The desirability of the use of a given amine in an amine/organoboron complex can be calculated from the energy difference between the Lewis acid-base complex and the sum of energies of the isolated Lewis acid (organoboron) and base (amine) known as binding energy. The more negative the binding energy the more stable the complex. Calculation of the binding energy and preferred binding energies are described in Sonnenschein et al., U.S. Pat. No. 6,706,831 at column 4, lines 36 to 57, incorporated herein by reference.

Preferred amines include the primary or secondary amines or polyamines containing primary or secondary amine groups, or ammonia as disclosed in Zharov, U.S. Pat. No. 5,539,070 at column 5, lines 41 to 53, incorporated herein by reference, Skoultchi; U.S. Pat. No. 5,106,928 at column 2, lines 29 to 58, incorporated herein by reference, and Pocius, U.S. Pat. No. 5,686,544 at column 7, line 29 to column 10 line 36, incorporated herein by reference; ethanolamine, secondary dialkyl diamines or polyoxyalkylenepolyamines; and amine terminated reaction products of diamines and compounds having two or more groups reactive with amines as disclosed in Deviny, U.S. Pat. No. 5,883,208 at column 7, line 30 to column 8 line 56, incorporated herein by reference. With respect to the reaction products described in Deviny the preferred diprimary amines include alkyl diprimary amines, aryl diprimary amines, alkyaryl diprimary amines and polyoxyalkylene diamines; and compounds reactive with amines include compounds which contain two or more moieties of carboxylic acids, carboxylic acid esters, carboxylic acid halides, aldehydes, epoxides, alcohols and acrylate groups. Preferred amines described in Deviny include n-octylamine, 1,6-diaminohexane (1,6-hexane diamine), diethylamine, dibutyl amine, diethylene triamine, dipropylene diamine, 1,3-propylene diamine (1,3-propane diamine), 1,2-propylene diamine, 1,2-ethane diamine, 1,5-pentane diamine, 1,12-dodecanediamine, 2-methyl-1,5-pentane diamine, 3-methyl-1,5-pentane diamine, triethylene tetraamine and diethylene triamine. Preferred polyoxyalkylene polyamines include polyethyleneoxide diamines, polypropyleneoxide diamines, triethylene glycol propylene diamine, polytetramethyleneoxide diamine and polyethyleneoxidecopolypropyleneoxide diamines.

In one preferred embodiment, the amine comprises a compound having a primary amine and one or more hydrogen bond accepting groups, wherein there are at least two carbon atoms, preferably at least about three carbon atoms, between the primary amine and hydrogen bond accepting groups. Preferably, an alkylene moiety is located between the primary amine and the hydrogen bond accepting group. Hydrogen bond accepting group means herein a functional group that through either inter- or intramolecular interaction with a hydrogen of the borane-complexing amine increases the electron density of the nitrogen of the amine group complexing with the borane. Preferred hydrogen bond accepting groups include primary amines, secondary amines, tertiary amines, ethers, halogen, polyethers, thioethers and polyamines. Preferred compounds having a primary amine and one or more hydrogen bond accepting groups are described in Sonnenschein et al., U.S. Pat. Nos. 6,730,759, (column 4, line 60 to column 5, line 67); 6,706,831; 6,713,578; 6,713,579 and 6,710,145 relevant portions, incorporated herein by reference.

In another embodiment the amine is an aliphatic heterocycle having at least one nitrogen in the heterocycle. The heterocyclic compound may also contain one or more of nitrogen, oxygen, sulfur or double bonds. In addition, the heterocycle may comprise multiple rings wherein at least one of the rings has nitrogen in the ring. Preferable aliphatic heterocyclic amines are described in Sonnenschein et al., U.S. Pat. Nos. 6,730,759 (column 6, lines 1 to 45); 6,706,831; 6,713,578; 6,713,579 and 6,710,145 relevant portions, incorporated herein by reference.

In yet another embodiment, the amine which is complexed with the organoboron is an amidine. Any compound with amidine structure wherein the amidine has sufficient binding energy as described hereinbefore with the organoboron, may be used. Preferred amidine compounds are described in Sonnenschein et al., U.S. Pat. Nos. 6,730,759, (column 6, line 4 to column 7, line 21); 6,706,831; 6,713,578; 6,713,579 and 6,710,145 relevant portions, incorporated herein by reference.

In yet another embodiment, the amine that is complexed with the organoboron is a conjugated imine. Any compound with a conjugated imine structure, wherein the imine has sufficient binding energy as described hereinbefore with the organoboron, may be used. The conjugated imine can be a straight or branched chain imine or a cyclic imine. Preferred imine compounds are described in Sonnenschein et al., U.S. Pat. Nos. 6,730,759 (column 7, line 22 to column 8, line 24); 6,706,831; 6,713,578; 6,713,579 and 6,710,145 relevant portions, incorporated herein by reference.

In another embodiment the amine can be an alicyclic compound having bound to the alicyclic ring a substituent containing an amine moiety. The amine containing alicyclic compound may have a second substituent that contains one or more nitrogen, oxygen, sulfur atoms or a double bond. The alicyclic ring can contain one or two double bonds. The alicyclic compound may be a single or multiple ring structure. Preferably the amine on the first substituent is primary or secondary. Preferably, the alicyclic ring is a 5 or 6 membered ring. Preferably functional groups on the second substituent are amines, ethers, thioethers or halogens. Preferred alicyclic compound with one or more amines containing substituents are described in Sonnenschein et al., U.S. Pat. Nos. 6,730,759 (column 8, line 25 to line 59); 6,706,831; 6,713,578; 6,713,579 and 6,710,145 relevant portions, incorporated herein by reference.

In another preferred embodiment the amine further contains siloxane, that is, an amino siloxane. Any compound with both amine and siloxane units wherein the amine has sufficient binding energy as described hereinbefore with the organoboron, may be used. Preferred amines with siloxane moieties are further described in U.S. Pat. No. 6,777,512, and titled AMINE ORGANOBORANE COMPLEX INITIATED POLYMERIZABLE COMPOSITIONS CONTAINING SILOXANE POLYMERIZABLE COMPONENTS, (column 10, line 14 to column 11, line 29, incorporated herein by reference).

In the embodiment where the organoboron compound is an organoboron amine complex, the equivalent ratio of amine compound(s) to borane compound in the complex is relatively important. An excess of amine is preferred to enhance the stability of the complex and in the embodiment where the liberating compound is an isocyanate functional compound to react with the isocyanate functional compound thereby resulting in the presence of polyurea in the final product. The presence of polyurea improves the high temperature properties of the composition. In one embodiment the organoboron compound is an amido-borate comprising a tetravalent boron anion wherein the boron atom is bound to a nitrogen compound either covalently or ionically. The amido-borate comprises one or more amido-borate anions and one or more corresponding cations which neutralize the amido-borate anion. A borate is a salt of a positive cation and an anionic tetravalent boron. The amido-borates are organoborates wherein one of the ligands on the boron atom is the nitrogen of ammonia or an organic compound which contains a nitrogen atom and which may contain a heteroatom or a heteroatom containing functional moieties wherein the nitrogen may be quaternary and cationic. In some embodiments, the cation can be the nitrogen bonded to the boron in the form of a quaternary nitrogen. This is especially true where the nitrogen compound used to form the amido-borate has more than one nitrogen which is bonded to more than one boron atoms of organoboranes to form the amido-borate. The organoborane bonded to the nitrogen atom to form the amido-borate comprises a boron atom with three bonds to hydrocarbyl moieties wherein the hydrocarbyl moieties may further comprise one or more heteroatoms or heteroatom containing functional groups which do not interfere in the described function of the amido-borate compounds. Preferred heteroatoms which may be present in hydrocarbyl moieties described herein include oxygen, sulfur, nitrogen, silicon, halogens, and the like with oxygen being most preferred. Preferred heteroatom containing functional groups which may be present as part of hydrocarbyl moieties as described herein include ethers, thioethers, amines, silanes, siloxanes and the like with ethers being most preferred. The boron atom may be bonded to three separate hydrocarbyl moieties or may be bonded to two hydrocarbyl moieties wherein one hydrocarbyl moiety has two bonds to the boron atom thereby forming one or more cyclic ring(s). The organoborane used to prepare the amido-borate is preferably a trialkyl borane or an alkyl cycloalkyl borane.

In one embodiment the amido-borate is a compound comprising one or more tetravalent boron anions and one or more of: i) an organic compound containing a nitrogen atom and a cation or ii) an ammonium cation; wherein the each of the one or more tetravalent boron atoms is bonded to the nitrogen atom of an ammonium cation or an organic compound containing a nitrogen atom. In another embodiment the amido-borate comprises two or more tetravalent boron anions wherein at least one of the borates anions is bonded to the nitrogen atom of an organic compound; and at least one of the borate anions is bonded to the nitrogen of an ammonium cation; and one or more additional cations wherein the number of additional cations is the same as the number of tetravalent boron atoms bonded to the nitrogen atom of an organic compounds containing at least one nitrogen atom.

The nitrogen containing portion of the amido-borate may be derived from ammonia any organic compound containing a nitrogen atom which is capable of bonding to boron and is preferably derived from ammonia, a hydrocarbyl amine or a polyamine. The nitrogen atoms of such compounds bonded to the boron atoms to form the borates can be primary, secondary, or quaternary, preferably secondary or tertiary or quaternary. In another preferred embodiment the nitrogen atom bonded to the organoborane to prepare the amido-borate is a nitrogen located in or on the ring of a heteroaromatic cyclic compound. In those embodiments where the nitrogen is quaternary, the quaternary nitrogen portion of the amido-borate is the cationic counterion for the borate anion portion of the compound to which the quaternary nitrogen atom is bonded. The hydrocarbyl amine or polyamine and the nitrogen containing aromatic heterocylic compound may contain heteroatoms as described hereinbefore or be further substituted with substituents which do not interfere with the functioning of such compounds in the compositions of the invention as described hereinbefore. The hydrocarbyl amines preferably correspond to the formula

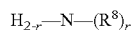

wherein $R^8$ is independently in each occurrence an alkyl, cycloalkyl, aryl, alkaryl, or aralkyl group; wherein such group may optionally contain one or more heteroatoms, one or more heteroatom containing functional groups, as described hereinbefore, or a proton. $R^8$ is preferably $C_{1-10}$ alkyl, $C_{3-10}$ cycloalkyl, $C_{6-12}$ aryl, $C_{7-20}$ alkaryl or $C_{7-20}$ aralkyl; wherein such group may optionally contain one or more heteroatoms of O or S, preferably O, or one or more O or S containing heteroatom functional moieties. $R^8$ is more preferably $C_{1-4}$ alkyl or $C_{1-10}$ alkoxyalkyl; even more preferably methyl, ethyl, propyl, methoxypropyl, ethoxypropyl or propoxypropyl. In reference to alkoxyalkyl, the number of carbon atoms refers to the total carbon atoms in the moiety. The hydrocarbyl polyamines preferably correspond to the formula

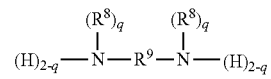

wherein $R^8$ is as described hereinbefore;
$R^9$ is independently in each occurrence a divalent hydrocarbyl moiety which may contain one or more heteroatoms or one or more heteroatom containing functional moieties as described hereinbefore;
r is independently in each occurrence 0, 1 or 2; and
q is independently in each occurrence 1 or 2.

The aromatic nitrogen containing heterocyclic compounds preferably correspond to the formula

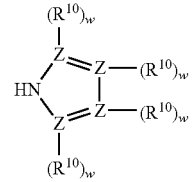

wherein $R^{10}$ is independently in each occurrence hydrogen, an alkyl, an alkoxyl, aralkyl or an aryl group; wherein such group may optionally contain one or more heteroatoms, one or more heteroatom containing functional moieties, as described hereinbefore, or a proton; Z is independently in each occurrence N, Si, P or C and w is 0 or 1 with the proviso that where Z is N or P, w can only be 0, whereas when Z is C or Si; w can only be 1. Preferably Z is N or C. $R^{10}$ is preferably hydrogen, $C_{1-10}$ alkyl, $C_{3-10}$ cycloalkyl, $C_{6-12}$ aryl, $C_{7-20}$ alkaryl or $C_{7-20}$ aralkyl; wherein such group may optionally contain one or more heteroatoms of O or S, preferably O, or one or more O or S heteroatom containing functional moieties. $R^3$ is more preferably hydrogen, $C_{1-4}$ alkyl or a $C_{1-10}$ alkoxyalkyl even more preferably hydrogen, methyl, ethyl, propyl and most preferably hydrogen. Preferably $R^9$ is independently in each occurrence $C_{2-20}$ alkylene, $C_{3-20}$ cycloalkylene, $C_{6-20}$ arylene, $C_{7-20}$ alkarylene or $C_{7-20}$ aralkylene; optionally containing one or more heteroatoms or heteroatom containing functional moieties; preferably $C_{2-20}$ alkylene or $C_{2-20}$ alkylene groups containing one or more oxygen atoms; and even more preferably $C_{2-4}$ alkylene. Preferred heteroatoms are O or S, with O most preferred.

The cation which forms the salt with the amido-borate can be any cation which forms a salt with the amido-borate. The cation can be any group IA and group IIA metal, any inorganic cation or organic cation. Preferably, the cation is an onium ion or an alkali metal ion. More preferably the cation is sodium, potassium, a phosphonium or an ammonium ion. Preferred ammonium ions are tetraalkyl ammonium ions, with tetramethyl ammonium ion being most preferred. Preferred phosphonium ions are tetraalkyl phosphonium or tetraaryl phosphonium; with tetrabutyl phosphonium and tetraphenyl phosphonium preferred.

The amido-borates preferably correspond to one of the formulas:

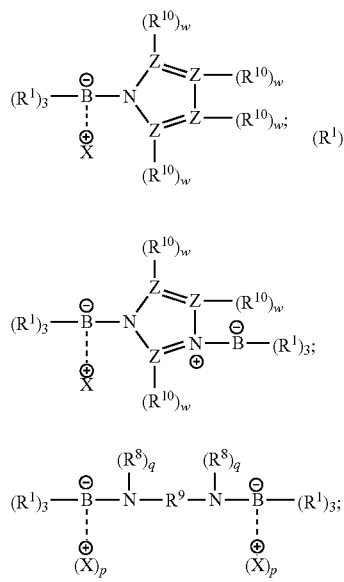

wherein $R^1$, $R^8$, $R^9$, $R^{10}$ and w are as described hereinbefore;
X is independently in each occurrence a cation;
p is independently in each occurrence 0 or 1;
q is independently in each occurrence 1 or 2 wherein q is 2. The nitrogen atom is the cation counter-balancing the borate anion;

with the proviso that the sum of p and q on each linked boron and nitrogen pair is 2; and the sum of the p is 1 or 2. Where q is 2, the nitrogen to which it is bonded is quaternary and carries a positive charge which balances the negative charge found on the boron of the borate and a cation is not needed to neutralize the borate.

Preferably, X is independently in each occurrence an onium or an alkali metal ion; more preferably X is an ammonium, phosphonium, potassium or sodium cation; even more preferably X is a tetraalkyl ammonium, tetraalkyl phosphonium, tetraaryl phosphonium or sodium and most preferably X is tetramethyl ammonium, tetrabutyl ammonium, tetrabutyl phosphonium or tetraphenyl phosphonium.

In another embodiment the cationic species can have more than one cationic species that form salts with the borate anions. Thus, the cationic species can form a salt with more than one borate species. Preferably, the cationic species with more than one cation have 2 to 4, preferably 2 or 3 cations and even more preferably 2. Among preferred cationic species having more than one cation are compounds having 2 or more ammonium or phosphonium cations, with compounds having two ammonium cations being preferred. Examples of such compounds include 1,2(di(trimethylammonium)) ethane. In the embodiment where the cationic species have more than one cation, the amido-borates preferably correspond to the formulas:

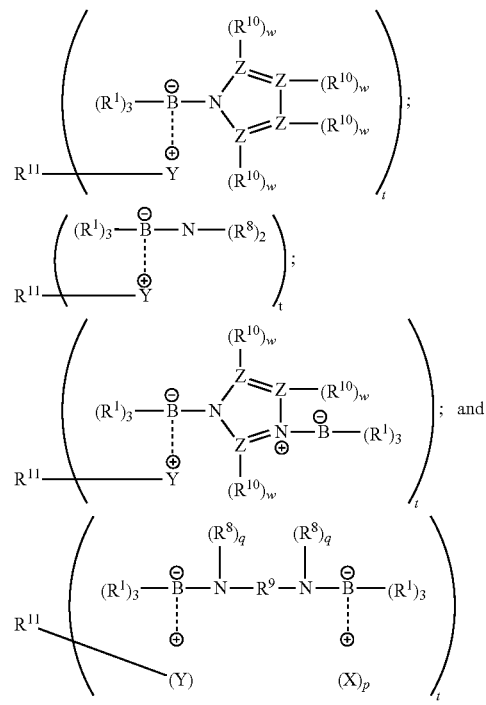

wherein $R^1$, $R^8$, $R^9$, $R^{10}$, w, X, p and q are as described hereinbefore;
$R^{11}$ is independently in each occurrence a t-valent hydrocarbyl group optionally containing one or more heteroatoms or heteroatom containing functional moieties as described hereinbefore;
Y is independently in each occurrence

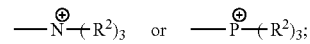

t is independently in each occurrence 2 or greater. Preferably, t is 2 to 4, even more preferably 2 or 3 and most preferably 2.

Preferably $R^{11}$ is independently in each occurrence a t-valent $C_{2-20}$ alkylene; $C_{3-20}$ cycloalkylene; $C_{6-20}$ arylene; $C_{7-20}$ alkarylene; or $C_{7-20}$ aralkylene optionally containing one or more heteroatoms or heteroatom containing functional moieties, preferred heteroatoms are sulfur and oxygen with oxygen most preferred. More preferably $R^{11}$ is a t-valent alkylene group, and more preferably a t-valent $C_{2-6}$ alkylene group. Most preferably $R^{11}$ is a divalent $C_{2-4}$ alkylene group.

The amido-borates can be prepared from the base amines described above, such amines are commercially available. The amine can be contacted with a base, in a solvent and no solvent if the amine is liquid, resulting in a salt. Inert organic solvents such as tetrahydrofuran may be used. A salt of the amine and the cation from the base is formed. The resulting salt is contacted with a trivalent organoborane to form the amido-borate. The contacting is preferably performed in a vacuum or under an inert atmosphere. Preferably, the process is performed at ambient temperatures. If a solvent is used, it can be removed in vacuo.

The amido-borate is capable of forming a trivalent organoboron compound. The amido-borates are tetravalent in that they have four bonds to the boron. The free radical generating species, the trivalent boron compound, is formed when the amido-borate is contacted with a liberating compound. The trivalent borane generates free radicals by reacting with environmental oxygen. The nitrogen containing portion of the amido-borate is preferably derived from ammonia, a hydrocarbyl amine or a polyamine. The nitrogen atoms of such compounds bonded to the boron atoms to form the borates can be primary, secondary or tertiary, preferably secondary or tertiary. In another embodiment the nitrogen atom bonded to the organoborane to prepare the amido-borate is a nitrogen located in or on the ring of a heteroaromatic cyclic compound. The nitrogen atom bonded to the boron atom can be primary, secondary, tertiary or quaternary. In those embodiments where the nitrogen is quaternary, the quaternary nitrogen portion of the amido-borate is the cationic counterion for the borate anion portion of the compound to which the quaternary nitrogen atom is bonded. The hydrocarbyl amine or polyamine and the nitrogen containing aromatic heterocylic compound may contain heteroatoms or be further substituted with substituents which do not interfere with the functioning of such compounds in the compositions of the invention. The hydrocarbyl amines preferably correspond to the formula

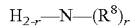

wherein $R^8$ is independently in each occurrence an alkyl, cycloalkyl, aryl, alkaryl, or aralkyl group; wherein such group may optionally contain a heteroatom, a heteroatom containing functional group or a proton. The hydrocarbyl polyamines preferably correspond to the formula

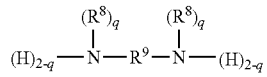

wherein $R^8$ is as described hereinbefore;
$R^9$ is independently in each occurrence a divalent hydrocarbyl moiety;
r is independently in each occurrence 0, 1 or 2; and
q is independently in each occurrence 1 or 2.

The aromatic nitrogen containing heterocyclic compounds preferably correspond to the formula

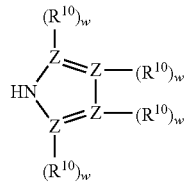

wherein $R^{10}$ is independently in each occurrence hydrogen, an alkyl or an aryl group; wherein such group may optionally containing a heteroatom, a heteroatom containing functional group or a proton; Z is independently in each occurrence N, Si, P or C and w is 0 or 1 with the proviso that where Z is N or P, w can only be 1, whereas when Z is C or Si; w can be 1 or 2.

The cation which forms the salt with the amido-borate can be any cation which forms a salt with the amido-borate. The cation can be any group IA and group IIA metal, any inorganic cation or organic cation. Preferably, the cation is an onium ion or an alkali metal ion. More preferably the cation is sodium, potassium or an ammonium or phosphonium ion. Preferred ammonium ions are tetraalkyl ammonium ions, with tetramethyl ammonium ion being most preferred.

The amido-borates preferably correspond to one of the formulas

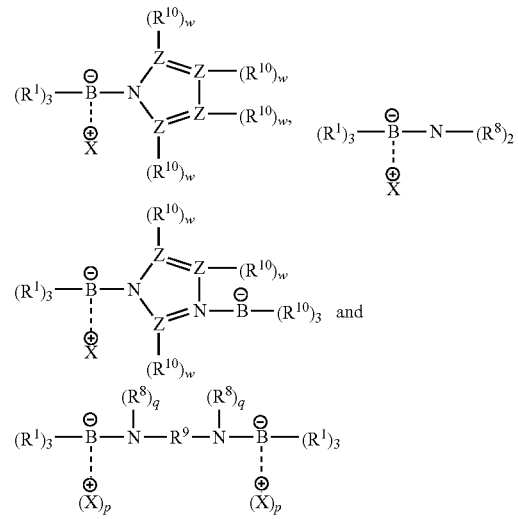

wherein $R^1$, $R^8$, $R^9$ and $R^{10}$ are as described hereinbefore;
X is independently in each occurrence a cation;
p is independently in each occurrence 0 or 1;
q is independently in each occurrence 1 or 2;

with the proviso that the sum of p and q on each linked boron and nitrogen pair is 2; and the sum of the p is 1 or 2. Where q is 2 the nitrogen to which it is bonded is quaternary and carries a positive charge which balances the negative charge found on the boron of the borate and a cation is not needed to neutralize the borate.

The amido-borates can be prepared from the base amines described above, such amines are commercially available. The amine can be contacted with a base, in a solvent and no solvent if the amine is liquid, resulting in a salt. A salt of the amine and the cation from the base is formed. The resulting salt is contacted with a trivalent organoborane to form the amido-borate.

The amido-borate is capable of forming a trivalent organoboron compound. The amido-borates are tetravalent in that they have four bonds to the boron. The free radical generating species, the trivalent boron compound, is formed when the amido-borate is contacted with a liberating compound. The trivalent borane generates free radicals by reacting with environmental oxygen.

The organoboron compounds capable of generating free radical generating species are used in the polymerizable compositions of the invention in an amount sufficient to initiate polymerization when the trivalent organoboron is liberated and to facilitate bonding of the polymerizable compositions where desired. Preferably, the organoboron compound is present in polymerizable compositions in an amount of about 0.1 part by weight based on 100 parts by weight of the composition or greater, more preferably about 0.5 parts by weight or greater and most preferably about 1 part by weight or greater. Preferably, the amido-borate is present in polymerizable compositions in an amount of about 30 parts by weight or less based on 100 parts by weight of the composition, more preferably about 20 parts by weight or less and most preferably about 10 parts by weight or less.

Compounds capable of free radical polymerization which may be used in the polymerizable compositions of the invention include any monomers, oligomers, polymers or mixtures thereof which contain olefinic unsaturation which can polymerize by free radical polymerization. Such compounds are well known to those skilled in the art. Mottus, U.S. Pat. No. 3,275,611, provides a description of such compounds at column 2, line 46 to column 4, line 16, incorporated herein by reference. Preferred classes of compounds containing olefinic unsaturation are Sonnenschein et al., U.S. Pat. Nos. 6,730,759 (column 9, line 7 to line 54); 6,706,831; 6,713,578; 6,713,579 and 6,710,145 relevant portions, incorporated herein by reference. Examples of preferable acrylates and methacrylates are disclosed in Skoultchi, U.S. Pat. No. 5,286,821 at column 3, line 50 to column 6, line 12, incorporated herein by reference and Pocius, U.S. Pat. No. 5,681,910 at column 9, line 28 to column 12, line 25, incorporated herein by reference. Also useful in these compositions are acrylate crosslinking molecules including ethylene glycol dimethacrylate, ethylene glycol diacrylate, triethyleneglycol dimethacrylate, diethylene glycol bismethacryloxy carbonate, polyethylene glycol diacrylate, tetraethylene glycol dimethacrylate, diglycerol diacrylate, diethylene glycol dimethacrylate, pentaerythritol triacrylate, trimethylolpropane trimethacrylate, isobornylmethacrylate and tetrahydrofurfuryl methacrylate. In the embodiment where the composition is used as an adhesive, acrylate and/or methacrylate based compounds are preferably used as the compounds capable of free radical polymerization. The most preferred acrylate and methacrylate compounds include methylmethacrylate, butylmethacrylate, 2-ethylhexylmethacrylate, and cyclohexylmethylmethacrylate.

Preferred amounts of compounds capable of free radical polymerization are preferably about 10 parts by weight or greater based on 100 parts of the total polymerizable composition, more preferably about 20 parts by weight or greater and most preferably about 30 parts by weight or greater. Preferred amounts of compounds capable of free radical polymerization are preferably about 90 parts by weight or less based on 100 parts by weight of the polymerizable composition, more preferably about 85 parts by weight or less and most preferably about 80 parts by weight or less.

In another embodiment, the compositions of the invention include two part polymerizable compositions comprising in one part an organoboron compound and one or more compounds containing one or more ring opening heterocyclic moieties, and in a second part, compounds capable of being polymerized by free radical polymerization, a catalyst capable of polymerizing compounds containing ring opening heterocyclic moieties, a halogenated polyolefin having halosulfonyl groups or a mixture of a halopolyolefin and an organic sulfonyl compound and, optionally, a component that will cause the organoboron compound to form a free radical generating species. In one embodiment the invention is a two phase system comprising a first phase containing one or more polymers prepared from the compounds which polymerize by free radical polymerization and a second phase comprising polymerized or partially polymerized compounds derived from one or more compounds containing ring opening heterocyclic moieties. Such polymerizable compositions and the polymers resulting from such compositions are described in Sonnenschein et al., U.S. Pat. No. 6,762,260 relevant compositions incorporated herein by reference. The compound containing a heterocyclic ring opening moiety can be any monomer, oligomer or prepolymer containing a heterocyclic moiety capable of ring opening and polymerization. The heteroatom in the heterocyclic moiety is preferably nitrogen, oxygen or sulfur, with nitrogen and oxygen being preferred and oxygen being most preferred. Preferably the heterocyclic moiety is a 3 membered ring. Preferred heterocyclic moieties are oxirane and aziridine moieties, with oxirane moieties being most preferred. Preferred heterocyclic ring opening compounds are further described in Sonnenschein et al., U.S. Pat. No. 6,762,260 (column 10, line 34 to column 11, line 22), incorporated herein by reference. The polymerizable formulation may contain about 2 parts by weight or greater of heterocyclic polymerizable compound based on 100 parts by weight of the polymerizable composition; more preferably about 5 parts by weight or greater and most preferred about 10 parts by weight or greater. The polymerizable formulation may contain about 50 parts by weight or less based on 100 parts by weight of the polymerizable composition, more preferably about 45 parts by weight or less and most preferably about 40 parts by weight or less of heterocyclic polymerizable compound. In some cases it may be useful to crosslink the free radical polymerizable compound phase to the heterocyclic ring opening polymerizable compound derived phase as described in Sonnenschein et al, U.S. Pat. No. 6,762,260 (column 11, line 53 to column 1, line 11), incorporated herein by reference. The amount of crosslinker used is that amount which gives the desired properties, that is, sufficient lap shear strength at 125° C. or above, yet does not cause the room temperature adhesive strength to go below the desired value as defined herein. Preferred amounts of crosslinker are about 0 part by weight or greater based on 100 weight parts of the polymerizable formulation, more preferably about 1 part by weight or greater; even more preferably about 3 parts by weight or greater and most preferably about 5 parts by weight or greater. Preferably the amount of crosslinker used is about 20 parts by weight or less based on 100 weight parts of the total polymerizable formulation; even more preferably about 15 parts by weight or less and most preferably about 12 parts by weight or less.

In one embodiment the invention of the polymerizable compositions may further comprise one or more compounds, oligomers or prepolymers having a siloxane backbone and reactive moieties capable of polymerization, a catalyst for the polymerization of the one or more compounds, oligomers or prepolymers having a siloxane backbone and reactive moieties capable of polymerization as disclosed in U.S. Pat. No. 6,777,512, titled AMINE ORGANOBORANE COMPLEX INITIATED POLYMERIZABLE COMPOSITIONS CONTAINING SILOXANE POLYMERIZABLE COMPONENTS (column 12, line 66 to column 15, line 54).

The organoboron compounds useful for polymerization of the compounds having moieties capable of free radical polymerization may be converted to compounds capable of forming free radical generating species by the application of a liberating compound, sometimes referred to as a decomplexation agent, that will cause the formation of compounds capable of forming free radical generating species, such as a trivalent borane compound, such as by displacing the amine from the borane.

The displacement of the amine from the alkylborane or the liberation of the trialkyl borane from the borate structure can occur with any chemical for which the exchange energy is favorable, such as mineral acids, organic acids, Lewis acids, isocyanates, acid chlorides, sulphonyl chlorides, aldehydes, and the like. Preferred liberating compounds are acids and isocyanates. In those embodiments where the initiator for the ring opening polymerization is a Lewis acid, the liberating compound may be omitted as Lewis acids may also function as the liberating compound. If the Lewis acid is used as the heterocyclic ring opening polymerization initiator no additional amounts are needed over those amounts needed to initiate polymerization to also function as the liberating compound. Polymerization may also be initiated thermally. The temperature at which the composition is heated to initiate polymerization is dictated by the binding energy of the complex or compound containing the organoborane. Generally the temperature used to initiate the polymerization by liberating the trialkyl borane is about 30° C. or greater and preferably about 50° C. or greater. Preferably the temperature at which thermally initiated polymerization is initiated is about 120° C. or less and more preferably about 100° C. or less. Any heat source that heats the composition to the desired temperature can be used, provided the heat source does not negatively impact the components of the composition or its function. In this manner the composition may be contacted with the substrates either before or after the composition is exposed to heat. If the composition is heated prior to contact with the substrates, the composition should be contacted with the substrates before the composition has polymerized to the point at which the composition is no longer able to adhere to the substrates. It may be necessary in the thermally initiated reaction to control the oxygen content such that there is adequate oxygen to create favorable conditions for radical formation but not so much as to inhibit the polymerization.

The compositions of the invention may further contain a stabilizing amount of a dihydrocarbyl hydroxylamine. Stabilizing as used herein refers to preventing polymerization until desired. Generally this means that polymerization is inhibited under normal storage conditions. Normal storage conditions mean storage at a temperature of about 0° C. to about 40° C., wherein the adhesive is stored in a sealed container. A stable composition is one that does not experience undesired viscosity growth during a defined period. Viscosity growth is evidence of polymerization of the monomers present. In a preferred embodiment, a composition is stable if the viscosity does not increase more than 150 percent over a time period of 30 days when stored at temperatures of 40° C. or less, more preferably 100 percent or less over a time period of 30 days and most preferably 50 percent or less over a time period of 30 days.

Dihydrocarbyl hydroxylamines useful herein include any such compounds which when included in the compositions of this invention; improve the stability of the compositions as described herein. Preferred dihydrocarbyl amines correspond to the formula $(R^{11})_2 N\text{—OH}$ wherein $R^{11}$ is independently in each occurrence a hydrocarbyl moiety. Preferably $R^{11}$ is independently in each occurrence a $C_{2-30}$ alkyl, alkaryl or aryl moiety; more preferably a $C_{10-20}$ alkyl, alkaryl or aryl moiety; with $C_{10-20}$ alkyl moieties being even more preferred. Among preferred dihydrocarbyl hydroxyl amines are hydroxylamine freebase from BASF, hydroxylamine derivatives from Mitsui Chemicals America, Inc. and IRGASTAB™ FS Products from Ciba Specialty Chemicals which contains oxidized bis (hydrogenate tallow alkyl) amine also described as bis(N-dodecyl) N-hydroxylamine. The dihydrocarbyl hydroxylamines are utilized in sufficient amounts to stabilize the compositions of the invention. Preferably the dihydrocarbyl hydroxylamines are used in an amount of about 1 part per million by weight of the compositions of the invention or greater, more preferably about 2 parts per million or greater and most preferably about 5 parts per million or greater. Preferably the dihydrocarbyl hydroxylamines are used in an amount of about 100,000 parts per million by weight of the compositions of the invention or less, more preferably about 50,000 parts per million or less, even more preferably about 10,000 parts per million or less and most preferably about 3,000 parts per million or less.

The compositions of the invention further comprise an accelerator for the cure of the polymerizable compositions. The accelerator is a halosulfonated halopolyolefin or a mixture of a halopolyolefin and an organic sulfonyl halide. Halopolyolefin means herein a polyolefin which is substituted with halogen atoms. Polyolefin as used herein refers to polymers derived from one or more compounds having carbon chains with unsaturation in the backbone where the polymerization occurs through the unsaturated sites of the compounds. Any halogenated polyolefin which donates electrons to the organoboron compound can be used. Preferred halogenated polyolefins are halogenated polyethylenes and halogenated polypropylenes or copolymers containing halogenated polyethylene or halogenated polypropylene segments. Preferably the halogenated polyolefins have sufficient elastomeric nature to improve the ductility of the polymerized composition of the invention. Preferred halogens on the polyolefins are fluorine and chlorine with chlorine most preferred. The halogenated polyolefins preferably have a halogen content of about 20 percent by weight or greater and more preferably about 25 percent by weight or greater. The halogenated polyolefins preferably have a halogen content of about 50 percent by weight or less and more preferably about 45 percent by weight or less and most preferably 40 percent by weight or less. In a most preferred embodiment the halogenated polyolefin is further substituted with sulfonyl halide groups. Preferred halides on the sulfonyl halides are fluorine and chlorine, with chlorine most preferred. Preferred halosulfonated halopolyolefins include HYPALON™ H-20, H-30, H-40, H-405, H-4085, H-48, HPG6525, Acsium, HPR 6983, CP, CPR 6140 and CP 337 chlorosulfonated chlorinated polyethylenes available from DuPont Performance Elastomers (HYPALON is a trademark of DuPont).

In another embodiment halopolyolefins which do not contain halosulfonyl groups may be used in conjunction with organic sulfonyl halides. Any organic sulfonyl halides which in conjunction with a halogenated polyolefin accelerate the cure of the polymerizable compositions of the invention may be used. Preferable sulfonyl chlorides include mono- or polyfunctional and can be $C_1$-$C_{12}$ alkyl sulfonyl chlorides, such as methane or butane sulfonyl chloride, $C_6$-$C_{24}$ aromatic sulfonyl chlorides, such as benzene or toluene sulfonyl chloride. Some sulfonyl chlorides containing hetero atoms have also been found to work, such as diphenylether-4,4'-disulfonyl chloride.

The halosulfonyl groups are preferably present in the form of substituents on the polyolefin or as a sulfonyl halide in sufficient amounts to provide about 0.1 grams of sulfur content or greater per 100 grams of halogenated polyolefin and more preferably about 0.5 grams or greater of sulfur per 100 grams of halogenated polyolefin. The halosulfonyl groups are preferably present in the form of substituents on the polyolefin or as a sulfonyl halide in sufficient amounts to provide 1.5 sulfur grams of content or less by per 100 grams of halogenated polyolefin and more preferably about 1.0 grams of sulfur or less per 100 grams of halogenated polyolefin. The halosulfonated halogenated polyolefin or composition of halogenated polyolefin and organic sulfonyl halide are present in a sufficient amount to increase the speed of cure of the polymerizable compositions of the invention. Preferably such compositions are present in an amount of about 20 parts by weight or greater based on 100 parts of the second part. Preferably such compositions are present in an amount of about 30 parts by weight or less of the second part and more preferably about 25 parts by weight or less.

Preferably, the accelerator is located in the part that does not contain the organoboron compound. Often the part containing the organoboron compound is referred to as the hardener side, and the other part is referred to as the resin side because the largest part of the polymerizable compound is found in this part. Hydrocarbyl as used herein means any moiety having both carbon and hydrogen atoms and includes saturated and unsaturated, branched and unbranched, hydrocarbon chains and/or ring structures. Alkyl refers to branched and unbranched saturated hydrocarbon chains. Alkenyl refers to branched and unbranched unsaturated hydrocarbon chains. Aryl means an aromatic hydrocarbon moiety. Alkaryl means an aromatic hydrocarbon moiety with a straight or branched hydrocarbon chain attached. Aralkyl means a straight or branched hydrocarbon chain with an aryl group attached. Acyl means a hydrocarbyl and carbonyl moiety. Unless otherwise stated these moieties may be substituted with any other substituent which does not significantly interfere in the function of the compound to which the moiety is attached or bonded.

The two-part polymerizable compositions or adhesive compositions of the invention are uniquely suited for use with conventional, commercially available dispensing equipment for two-part compositions. Once the two-parts have been combined, the composition should be used quickly, as the useful pot life (open time) may be short depending upon the monomer mix, the amount of organoboron compound, the amount of catalyst and the temperature at which the bonding is performed. The adhesive compositions of the invention are applied to one or both substrates and then the substrates are joined together, preferably with pressure to force excess composition out of the bond line. In general, the bonds should be made shortly after the composition has been applied, preferably within about 10 minutes. The typical bond line thickness is about 0.005 inches (0.13 mm) to about 0.03 inches (0.76 mm). The bond line can be thicker if gap filling is needed as the composition of the invention can function as both an adhesive and a gap filler. The bonding process can easily be carried out at room temperature and to improve the degree of bonding, it is desirable to keep the temperature below about 40° C., preferably below about 30° C., and most preferably below about 25° C.

The compositions may further comprise a variety of optional additives. One particularly useful additive is a thickener such as medium to high (about 10,000 to about 1,000,000) molecular weight polymethyl methacrylate which may be incorporated in an amount of about 10 to about 60 weight parts, based on 100 parts by weight of the composition. Thickeners may be employed to increase the viscosity of the composition to facilitate application of the composition.

Another particularly useful additive is an elastomeric material. The materials may improve the fracture toughness of compositions made therewith which can be beneficial when, for example, bonding stiff, high yield strength materials such as metal substrates that do not mechanically absorb energy as easily as other materials, such as flexible polymeric substrates. Such additives can be incorporated in an amount of about 5 parts to about 35 parts by weight, based on 100 parts by weight of the composition. Useful elastomeric modifiers include the chlorinated or chlorosulphonated polyethylenes used as accelerators herein such as HYPALON™ 30 (commercially available from E. I. Dupont de Nemours & Co., Wilmington, Del.) and block copolymers of styrene and conjugated dienes (commercially available from Dexco Polymers under the trademark VECTOR, and Firestone under the trademark STEREON). Also useful, and even more preferred, are certain graft copolymer resins such as particles that comprise rubber or rubber-like cores or networks that are surrounded by relatively hard shells, these materials often being referred to as "core-shell" polymers. Most preferred are the acrylonitrile-butadiene-styrene graft copolymers available from Rohm and Haas. In addition to improving the fracture toughness of the composition, core-shell polymers can also impart enhanced spreading and flow properties to the uncured composition. These enhanced properties may be manifested by a reduced tendency for the composition to leave an undesirable "string" upon dispensing from a syringe-type applicator, or sag or slump after having been applied to a vertical surface. Use of more than about 20 parts by weight based on 100 parts by weight of the polymerizable composition of a core-shell polymer additive is desirable for achieving improved sag-slump resistance. Generally the amount of toughening polymer used is that amount which gives the desired toughness to the polymer or the adhesive prepared.

Polymerizable compositions according to the invention may be used in wide variety of ways, including as adhesives, coatings, primers, to modify the surface of polymers, and injection molding resins. They may also be used as matrix resins in conjunction with glass and metal fiber mats such as in resin transfer molding operations. They may further be used as encapsulants and potting compounds such as in the manufacture of electrical components, printed circuit boards and the like. Quite desirably, they provide polymerizable adhesive compositions that can bond a wide range of substrates, including polymers, wood, ceramics, concrete, glass and primed metals. Another desirable related application is their use in promoting adhesion of paints to low surface energy substrates such as polyethylene, polypropylene, polyethyleneterephthalate, polyamides, and polytetrafluoroethylene, and their co-polymers. In this embodiment the composition is coated onto the surface of the substrate to modify the surface to enhance the adhesion of the final coating to the surface of the substrate.

The compositions of the invention can be used in coating applications. In such applications the composition may further comprise a carrier such as a solvent. The coating may further contain additives well known to those skilled in the art for use coatings, such as pigments to color the coating, inhibitors and UV stabilizers. The compositions may also be applied as powder coatings and may contain the additives well known to those skilled in the art for use in powder coatings.

The compositions of the invention can also be used to modify the surface of a polymeric molded part, extruded film or contoured object. Compositions of the invention can also be used to change the functionality of a polymer particle by surface grafting of polymer chains on to the unmodified plastic substrate.

Polymerizable compositions of the invention are especially useful for adhesively bonding low surface energy plastic or polymeric substrates that historically have been very difficult to bond without using complicated surface preparation techniques, priming, etc. By low surface energy substrates is meant materials that have a surface energy of about 45 mJ/$m^2$ or less, more preferably about 40 mJ/$m^2$ or less and most preferably about 35 mJ/$m^2$ or less. Included among such materials are polyethylene, polypropylene, acrylonitrile-butadiene-styrene, polyamides, syndiotactic polystyrene, olefin containing block co-polymers, and fluorinated polymers such as polytetrafluoroethylene (TEFLON™) which has a surface energy of less than about 20 mJ/$m^2$. (The expression "surface energy" is often used synonymously with "critical wetting tension" by others.) Other polymers of somewhat higher surface energy that may be usefully bonded with the compositions of the invention include polycarbonate, polymethylmethacrylate, and polyvinylchloride.

The polymerizable compositions of the invention can be easily used as two-part adhesives. The components of the polymerizable compositions are blended as would normally be done when working with such materials. The liberating compound for the organoboron compound is usually included with the olefinic, polymerizable component so as to separate it from the organoboron compound, thus providing one-part of the two-part composition. The organoboron compounds of the polymerization initiator system provides the second part of the composition and is added to the first part shortly before it is desired to use the composition. Similarly, the Lewis acid catalyst where used for the heterocyclic ring opening compound polymerization is kept separate from the heterocyclic ring opening compound. The Lewis acid catalyst may be added to the first part directly or it may be pre-dissolved in an appropriate carrier such as a reactive olefinic monomer, i.e., methyl methacrylate or a MMA/PMMA viscous solution.

For a two-part adhesive such as those of the invention to be most easily used in commercial and industrial environments, the volume ratio at which the two-parts are combined should be a convenient whole number. This facilitates application of the adhesive with conventional, commercially available dispensers. Such dispensers are shown in U.S. Pat. Nos. 4,538,920 and 5,082,147 (incorporated herein by reference) and are available from Conprotec, Inc. (Salem, N.J.) under the trade name MIXPAC. Typically, these dispensers use a pair of tubular receptacles arranged side-by-side with each tube being intended to receive one of the two-parts of the adhesive. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two-parts. The blended adhesive is extruded from the mixing chamber onto a substrate. Once the tubes have been emptied, they can be replaced with fresh tubes and the application process continued. The ratio at which the two-parts of the adhesive are combined is controlled by the diameter of the tubes. (Each plunger is sized to be received within a tube of fixed diameter, and the plungers are advanced into the tubes at the same speed.) A single dispenser is often intended for use with a variety of different two-part adhesives and the plungers are sized to deliver the two-parts of the adhesive at a convenient mix ratio. Some common mix ratios are 1:1, 2:1, 4:1 and 10:1, but preferably less than about 10:1 and more preferably less than about 4:1.

Preferably, the mixed two-part compositions of the invention have a suitable viscosity to allow application without dripping. Preferably, the viscosities of the two individual components should be of the same order or magnitude. Preferably, the mixed compositions have the viscosity of about 100 (0.1 Pa·S) centipoise or greater, more preferably about 1,000 (1.0 Pa·S) centipoise or greater and most preferably about 5,000 (5.0 Pa·S) centipoise or greater. Preferably the adhesive compositions have a viscosity of about 150,000 (150 Pa·S) centipoise or less, more preferably about 100,000 (100 Pa·S) centipoise or less and most preferably about 50,000 (50 Pa·S) centipoise or less.

Specific Embodiments

The following examples are included for illustrative purposes only and are not intended to limit the scope of the claims. Unless otherwise stated all parts and percentages are by weight.

Ingredients

The following ingredients were used in the examples provided hereinafter:

Methyl methacrylate—with 50 ppm MEHQ™ supplied by Rohm and Haas Company;

HYPALON™ 20—chlorosulfonated chlorinated polyethylene, trademark of DuPont;

PARALOID™ BTA-753(ER)— methacrylate-butadiene-styrene copolymer, trademark of Rohm and Haas Company;

4-Methoxyphenol supplied by Aldrich Chemical Company, Inc.

HYCAR™2000X168-1,3-butadiene, homopolymer, carboxy-terminated, ester with glycidyl methacrylate trademark of Noveon, Inc.

Acrylic Acid supplied by Aldrich Chemical Company, Inc.

4-Methoxyphenol supplied by Aldrich Chemical Company, Inc.

1,4-Benzoquinone supplied by Aldrich Chemical Company, Inc.

CAB-O-SIL™—fumed silica trademark of Cabot Corporation.

Two part formulations were prepared by mixing the ingredients for each part and then placed in separate containers. Several different part A (resin side) formulations were made.

Adhesive Preparation

All resin formulations were mixed using a dual asymmetric centrifugal FlackTek SpeedMixer™ DAC 400 FVZ by Hauschild Engineering. The chlorinated polyethylene was combined with methyl methacrylate (MMA) into a preblend in a 40 percent chlorosulfonated chlorinated polyethylene to 60 percent MMA ratio using a roller mill. The chlorinated chlorosulfonated polyethylene MMA preblend was added to a speed mixing cup followed by methyl methacrylate and methoxyphenol (MEHQ™). The methacrylate-butadiene-styrene copolymer was then added to the speed mixing cup and immediately incorporated with the other ingredients by hand using a tongue depressor. The speed mixing cup was placed into the speed mixer and mixed three times consecutively for one minute at a speed of 1,800 rpm. The temperature of the sample was checked after each mix using an infrared temperature probe and visually evaluated for homogeneity. If the sample was not visually homogeneous, additional one minute 1,800 rpm mixing cycles were utilized until visual homogeneity was achieved. The temperature of each sample was kept below 130° F. (54° C.) by letting the sample sit at room temperature between additional mixes. After each sample was cooled to room temperature, methacrylic acid was charged into the speed mixing cup and immediately incorporated by hand using a tongue depressor. The speed mixing cup was then placed into the speed mixer and mixed twice for 1 minute at 1,800 rpm.

Lap Shear Preparation

The substrates used in the lap shear construction were ED6100H E-Coated cold rolled steel supplied by ACT Laboratories, Inc. and DLGF 9310.00ZB glass filled polypropylene supplied by The Dow Chemical Company. Each substrate was cut into 1 inch×4 inch (2.54 cm×10.2 cm) strips. The ½ inch (1.27 cm) bonding section of each strip was measured and marked. All resin formulations were combined with the hardener using a bag mixing technique. This bag mixing process was accomplished by adding the hardener then resin to a polyethylene bag in a one to one ratio by weight. The bag was sealed and mixed by hand using a rolling motion on the palm of the hand to ensure an even mix was present. The corner of the bag was cut with scissors and the mixed adhesive was applied evenly to one side of the pre-marked ½ inch (1.27 cm) portion of the 1 inch×4 inch (2.54 cm×10.2 cm) substrate strips. To ensure consistent bond thickness 30 mil (0.76 mm) glass beads were applied to the adhesive and another 1 inch×4 inch (2.54 cm×10.2 cm) substrate strip was laid on top to assemble the lap shear joint. The lap shears were held together with clips while curing for various times at room temperature.

Lap Shear Testing

The loads to failure of the lap shears were measured using an Instron® 5500R Materials Testing System (Instron Corporation). Pneumatic grips were used to hold the lap shear samples in place. The distance between the grips was seven inches (17.8 cm). The crosshead speed was 0.5 in./min (1.27 cm/min.). The computer measured the load as a function of crosshead displacement and loads were converted to pounds of force per square inch of bond area. After each lap shear was tested to failure, a failure mode was assigned by visual evaluation. Failure modes were classified as Adhesive Failure AF, Cohesive Failure CF, Thin Film Cohesive Failure TFCF, Substrate Failure SUB, Surface Delamination SD, or E-coat Failure or voids V. If a mixed failure mode was present each failure mode was reported and a percentage estimate was assigned.

Part B comprised 65 percent methyl methacrylate, 25 percent of methacrylate-butadiene-styrene copolymer, 0.25 percent of IRGASTAB™ FS301 FF which is IRGASTAB™ FS301 FF— a mixture of oxidized bis(hydrogenated tallow alkyl) amines (IRGASTAB™ FS042) and tris (2,4-di-tert-butyl phenol) phosphite trademark of Ciba Specialty Chemicals and 10 parts of a complex of tri-n-butyl borane and methoxypropyl amine. Several Part A formulations were prepared using the procedures described above. The formulations are described below in Table 1.

The examples illustrate the strength development as a function of time of alkylborane cured adhesive is dependent on chlorosulfonated chloropolyethylene content. The data of Table 1 is compiled in a bar graph in FIG. 1.

TABLE 1

|  | Example | | | | |
| --- | --- | --- | --- | --- | --- |
| Ingredients for Part A | 1 % | 2 % | 3 % | 4 % | 5 % |
| Methyl Methacrylate | 64 | 58.8 | 56 | 54 | 44.5 |
| Chlorosulfonated chlorinated polyethylene | 10 | 15.2 | 18 | 20 | 29.5 |
| methacrylate-butadiene-styrene copolymer | 16.25 | 16.25 | 16.25 | 16.25 | 16.25 |
| Methacrylic acid | 9.5 | 9.5 | 9.5 | 9.5 | 9.5 |
| Methyl ether of hydroquinone | 0.25 | 0.25 | 0.25 | 0.25 | 0.25 |
| Total | 100 | 100 | 100 | 100 | 100 |
| Results of Lap Shear Testing | | | | | |
| 3 Hour Room Temperature Cure E-Coat Substrate Lap Shear psi/(MPa) failure mode | 31(0.21) CF | 32(0.22) CF | 23(0.16) CF | 35(0.24) CF | 71(0.49) CF |
| 5 Hour Room Temperature Cure E-Coat Substrate Lap Shear psi/(MPa) failure mode | 51(0.35) 50% CF 50% TFCF | 50(0.34) CF | 55(0.38) 25% CF 75% TFCF | 81(0.56) 67% CF 33% TFCF | 223(1.54) CF |
| 24 Hour Room Temperature Cure E-Coat Substrate Lap Shear psi/(MPa) failure mode | 527(3.63) CF | 582(4.01) CF | 605(4.17) 80% CF 20% TFCF | 934(6.44) 77% CF 23% TFCF | 1027(7.08) CF |
| 24 Hour Room Temperature Cure Polypropylene Substrate Lap Shear psi/(MPa) failure mode | 699(4.82) 77% CF 23% SD | 651(4.49) CF | 622(4.29) CF | 701(4.83) 40% CF 33% SUB 27% AF | 517(3.56) 27% CF 73% AF |

The invention claimed is:

1. A method of polymerization comprising contacting the components of a polymerizable composition comprising a two part polymerizable composition comprising in one part an organoboron compound capable of forming free radical generating species wherein the organoboron compound is a complex of a trialkyl borane and a compound having a primary amine and one or more hydrogen bond accepting groups, wherein the one or more hydrogen bond accepting group is selected from ether, polyether or thioether, and there are at least two carbon atoms between the primary amine and the hydrogen bond accepting groups and in the second part one or more compounds capable of free radical polymerization and from about 20 to about 30 parts by weight based on 100 parts by weight of the second part of a chlorinated polyethylene having chlorosulfonyl groups and a liberating compound capable of causing the organoboron compound to form free radical generating species upon contacting the two parts under conditions such that the one or more compounds capable of free radical polymerization undergo polymerization.

2. A method of polymerization according to claim 1 wherein the contacting occurs at, or near, ambient temperature.

3. A method of bonding two or more substrates together which comprises:
    contacting the components of a composition comprising a
        two part polymerizable composition comprising in one
        part an organoboron compound capable of forming free
        radical generating species wherein the organoboron compound is a complex of a trialkyl borane and a compound having a primary amine and one or more hydrogen bond accepting groups, wherein the one or more hydrogen bond accepting groups is selected from ether, polyether, or thioether, and there are at least two carbon atoms between the primary amine and the hydrogen bond accepting groups and in the second part one or more compounds capable of free radical polymerization and from about 20 to about 30 parts by weight based on 100 parts by weight of the second part of a chlorinated polyethylene having chlorosulfonyl groups and a liberating compound capable of causing the organoboron compound to form free radical generating species upon contacting the two parts together under conditions such that polymerization is initiated;

contacting the composition with the two or more substrates;

positioning the two or more substrates such that the composition is located between the two or more substrates wherein they are in contact with one another; and allowing the composition to cure so as to bind the two or more substrates together.

4. A method of bonding according to claim 3 wherein the contacting of the two part polymerizable composition and of the composition with the substrates occurs at, or near, ambient temperature.

5. A method of coating a substrate which comprises contacting the components a composition comprising a two part polymerizable composition comprising in one part an organoboron compound capable of forming free radical generating species wherein the organoboron compound is a complex of a trialkyl borane and a compound having a primary amine and one or more hydrogen bond accepting groups, wherein the one or more hydrogen bond accepting groups is selected from ether, polyether, or thioether, and there are at least two carbon atoms between the primary amine and the hydrogen bond accepting groups, and in the second part one or more compounds capable of free radical polymerization and from about 20 to about 30 parts by weight based on 100 parts by weight of the second part of a chlorinated polyethylene having chlorosulfonyl groups and a liberating compound capable of causing the organoboron compound to form free radical generating species upon contacting the two parts; contacting the contacted composition with one or more surfaces of a substrate; and allowing the composition to cure.

6. A coating composition comprising a two part polymerizable composition comprising in one part an organoboron compound capable of forming free radical generating species wherein the organoboron compound is a complex of a trialkyl borane and a compound having a primary amine and one or more hydrogen bond accepting groups, wherein the one more hydrogen bond accepting groups is selected from ether, polyether, or thioether, and there are at least two carbon atoms between the primary amine and the hydrogen bond accepting groups and in the second part one or more compounds capable of free radical polymerization and from about 20 to about 30 parts by weight based on 100 parts by weight of the second part of a chlorinated polyethylene having chlorosulfonyl groups and a liberating compound capable of causing the organoboron compound to form free radical generating species upon contacting the two parts; and one or more of one or more carriers or one or more pigments.

7. A method according to claim 1 wherein the first part further comprises one or more compounds capable of free radical polymerization.

8. A method according to claim 1 wherein the one or more compounds capable of free radical polymerization comprise acrylate or methacrylate based monomers, oligomers, polymers or a mixture thereof.

9. A method according to claim 1 wherein the weight of the chlorine on the chlorinated polyethylene having chlorosulfonyl groups is about 20 percent to about 45 percent based on the weight of the chlorinated polyethylene having chlorosulfonyl groups.

10. A method according to claim 3 wherein the first part further comprises one or more compounds capable of free radical polymerization.

11. A method according to claim 3 wherein the one or more compounds capable of free radical polymerization comprise acrylate or methacrylate based monomers, oligomers, polymers or a mixture thereof.

12. A method according to claim 3 wherein the weight of the chlorine on the chlorinated polyethylene having chlorosulfonyl groups is about 20 percent to about 45 percent based on the weight of the chlorinated polyethylene having chlorosulfonyl groups.

13. A composition according to claim 6 wherein the first part further comprises one or more compounds capable of free radical polymerization.

14. A composition according to claim 6 wherein the one or more compounds capable of free radical polymerization comprise acrylate or methacrylate based monomers, oligomers, polymers or a mixture thereof.

15. A composition according to claim 6 wherein the weight of the chlorine on the chlorinated polyethylene having chlorosulfonyl groups is about 20 percent to about 45 percent based on the weight of the chlorinated polyethylene having chlorosulfonyl groups.

* * * * *